(12) United States Patent
Yu (10) Patent No.: US 6,635,844 B2
(45) Date of Patent: Oct. 21, 2003

(54) APPARATUS FOR ON-LINE CLEANING A WAFER CHUCK WITH LASER

(75) Inventor: Cheng-Hung Yu, Hsin-Chu (TW)

(73) Assignee: United Microelectronics Corp., Hsin-Chu (TW)

( * ) Notice: Subject to any disclaimer, the term of this patent is extended or adjusted under 35 U.S.C. 154(b) by 24 days.

(21) Appl. No.: 09/683,467

(22) Filed: Jan. 3, 2002

(65) Prior Publication Data

US 2003/0121896 A1 Jul. 3, 2003

(51) Int. Cl.⁷ .......................... B23K 26/00; B23K 26/12
(52) U.S. Cl. .................. 219/121.68; 219/121.84
(58) Field of Search ............... 219/121.68, 121.69; 355/67

(56) References Cited

U.S. PATENT DOCUMENTS

| | | | |
|---|---|---|---|
| 4,059,461 A | * | 11/1977 | Fan et al. |
| 5,669,979 A | * | 9/1997 | Elliot et al. |
| 5,814,156 A | * | 9/1998 | Elliot et al. |
| 5,821,175 A | * | 10/1998 | Engelsberg |
| 6,394,105 B1 | * | 5/2002 | Boszormenyi et al. |

FOREIGN PATENT DOCUMENTS

| | | | |
|---|---|---|---|
| JP | 8-37227 A | * | 2/1996 |
| JP | 9-252045 A | * | 9/1997 |
| JP | 10-335199 A | * | 12/1998 |
| JP | 11-6086 A | * | 1/1999 |

* cited by examiner

Primary Examiner—Geoffrey S. Evans
(74) Attorney, Agent, or Firm—Winston Hsu (57) ABSTRACT

A stepper system, having an apparatus for on-line cleaning a wafer chuck by utilizing laser, has a wafer stage capable of moving horizontally along x-y directions and vertically along z direction, the wafer chuck, having a top surface contaminated by organic materials, fixed on the wafer stage, a laminar flow chamber used to isolate the wafer chuck during the cleaning of the wafer chuck, an excimer laser generation module, a laser beam delivery system and a projection lens system both for guiding the pulse laser to the contaminated top surface of the wafer chuck to decompose the organic materials thereon, and an inert gas supply for providing an inert gas flow to remove the decomposed organic materials from the top surface of the wafer chuck. A control system is further used to control the global or local cleaning of the contaminated top surface.

17 Claims, 5 Drawing Sheets

APPARATUS FOR ON-LINE CLEANING A WAFER CHUCK WITH LASER

BACKGROUND OF INVENTION

1. Field of the Invention

The present invention relates to an apparatus for on-line cleaning a wafer chuck of a stepper system, and more particularly, to an apparatus for on-line cleaning a wafer chuck of a stepper system by using laser.

2. Description of the Prior Art

In integrated circuit processes, a lithography process is an essential technique. A lithography process is used to form a design pattern, such as a circuit pattern or a layout of an implantation area and the like, onto one or more masks. The pattern on the mask is then transferred to a semiconductor wafer by an exposure process using a stepper and a scanner. The lithography technique commonly used is a photolithography technique. The light source includes krypton fluoride (KrF) laser (248 nm), ArF laser (193 nm), $F_2$ laser (157 nm), and so forth, wherein the KrF laser is more popular. Other exposure techniques and non-optical lithography techniques, such as extreme UV (EUV) and e-beam, still remain to be developed.

Figure 1:
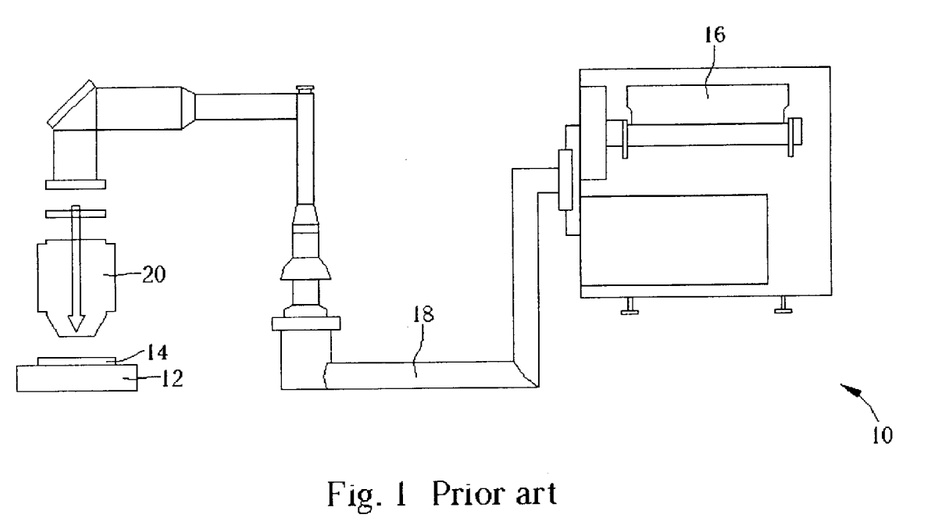
FIG. 1 is a schematic diagram of a stepper system for an exposure process according to the prior art.

Please refer to FIG. 1 of a schematic diagram of a stepper system 10 for an exposure process according to the prior art. As shown in FIG. 1, the stepper system 10 comprises a wafer stage 12 capable of horizontally moving along x-y directions and vertically moving along a z direction, a wafer chuck 14 fixed on the wafer stage 12 utilizing vacuuming to hold a semiconductor wafer thereon, an excimer laser generation module 16 for generating a pulse laser, a laser beam delivery system 18 for guiding the pulse laser, and a projection lens system 20 for focusing the pulse laser.

During the exposure process, the excimer laser generation module 16 generates a KrF pulse laser with a predetermined wavelength, and then the laser beam delivery system 18 guides the pulse laser to the wafer chuck 14 on the wafer stage 12 at a predetermined incident angle. By using the projection lens system 20, the pulse laser is focused onto the semiconductor wafer (not shown) on the wafer chuck 14. Then the semiconductor wafer on the wafer chuck 14 is carried by the movement of the wafer stage 12, and the pulse laser is applied to a portion of a surface of the semiconductor wafer through a mask and projection lenses thereafter. Finally, the pattern on the mask is transferred to the whole wafer surface by utilizing the wafer stage 12 of the stepper system 10 steppedly.

Generally, the wafer chuck 14 fixed on the wafer stage 12 is employed as a carrier to carry and handle the wafer during the exposure process. Since the wafer chuck 14 utilizes vacuuming to hold the wafer thereon, the surface of wafer chuck 14 directly contacts with the back of wafer. Thus, the wafer chuck 14 is easily contaminated and the flatness and roughness of its surface influence the quality of the exposed pattern on the wafer. Unfortunately, since the back surface of the semiconductor wafer is frequently contaminated by organic materials during the coating or the baking process, the surface flatness of the wafer chuck 14 is thus defective due to contaminants remained on the wafer chuck 14, causing surfaces of next batches of wafers tilted for the exposure process and leading to defective pattern transfer thereon. Moreover, the contaminants on the wafer chuck surface cause orderly or random local defocuses as well and thus affect both the quality and the effect of the exposure process.

To ensure the quality of the exposure process and the yield of the products, ultra-flat monitor wafers and a machine detecting system are employed in most alignment systems to daily monitor the surface flatness of the wafer chuck and detect contaminants on the wafer chuck surface so as to reflect the local defocuses thereon. Once the contaminants are detected, a cleaning process is performed manually by using a grindstone, a wiper or chemicals, such as isopropyl alcohol (IPA), to remove the contaminants from the surface of the wafer chuck. However, the wafer chuck is hardly cleaned by this cleaning method due to many crannies in the wafer chuck surface. In addition, the complicated alignment system around the wafer chuck is frequently touched during the cleaning process, thus leading to malfunctions of the alignment system. An alternative method to completely remove the contaminants on the wafer chuck is to unload the wafer chuck for the cleaning process. However, this method requires certain times of adjustment after the wafer chuck is reloaded again, and thus costs lots of man-hours and a long down time of the machine. Besides, when the wafer chuck is unloaded, external contaminants can easily contaminate the stepper system due to a cover thereof opened.

SUMMARY OF INVENTION

It is therefore a primary objective of the present invention to provide a stepper system with an apparatus for on-line cleaning a wafer chuck with laser, so as to solve the previously mentioned problems.

According to the claimed invention, the stepper system, having an apparatus for on-line cleaning the wafer chuck with laser, comprises a wafer stage capable of horizontally moving along x-y directions, a wafer chuck fixed on the wafer stage and having a top surface contaminated by organic materials, a laminar flow chamber used to isolate the wafer chuck during the cleaning of the wafer chuck, an excimer laser generation module, a laser beam delivery system and a projection lens system both for guiding the pulse laser to the contaminated top surface of the wafer chuck, and decomposing the organic materials thereon by the pulse laser, and an inert gas supply for providing an inert gas flow to remove the decomposed organic materials from the top surface of the wafer chuck. The stepper system further comprises a control system capable of being combined with an original control device and used to control the global or local cleaning of the contaminated top surface of the wafer chuck.

It is an advantage of the present invention that a laser cleaning process is employed to remove contaminants on the surface of the wafer chuck and thus avoids the various shortcomings of a manually cleaning process. In addition, the present invention further combines a stepper system with a control system to carry out an on-line cleaning process for the wafer chuck. Efforts spent on handling abnormal situations during flatness monitor process of the wafer chuck are saved, the down time of the stepper system is reduced, and contamination to the system environment is prevented therefore. Additionally, both the exposure process and the cleaning process for the wafer chuck use a same light source. The manufacturing cost is thus reduced with an acceptable performance of the exposure process ensured.

It is to be understood that both the foregoing general description and the following detailed description are exemplary, but are not restrictive, of the invention.

DETAILED DESCRIPTION

According to the principles of quantum physics, a photon flux of a laser provides sufficient energy and power to break the covalent bonds holding contaminants to a surface of a wafer chuck. Thereby the contaminants are easily levitated from the surface and then the purpose of cleaning attains. This is the principle of a laser cleaning. In U.S. Pat. No. 4,782,029, a removal of an oxide film or a nitride film on the back surface of a semiconductor substrate with a laser beam having a wavelength of 150 to 400 nm and an energy density of 0.5 to 10 $J/cm^2$ is disclosed. In addition, in U.S. Pat. No. 5,151,135, a removal of chemical contaminants on solid surfaces with an UV laser beam having a wavelength of 180 to 435 nm and an energy density of 0.1 to 0.3 $J/cm^2$ is also disclosed. Therefore, the present invention employs the previously mentioned laser cleaning principle to remove the contaminants from the wafer chuck by providing an apparatus for on-line cleaning the wafer chuck with laser to a stepper system. The stepper system comprises a laser light source for removing the contaminants on the wafer chuck surface, a chamber and a gas flowing system for ensuring the removal of the contaminants, and a control system used to carry out an on-line laser cleaning process for the wafer chuck.

Since the energy of the laser is required to be sufficient to remove contaminants, such as hydrocarbons generated in the air and metal debris, accumulated on the back surface of the wafer, the preferred laser light source in the present invention tends to be a DUV excimer laser, such as an ArF laser with 193 nm, a KrF laser, the most well-developed and broadly applied DUV excimer laser to date, with 248 nm, and a $F_2$ laser with 157 nm. Alternatively, the laser sources are solid and gas lasers, such as Nd:YAG or $CO_2$ lasers. The DUV excimer laser is commonly employed for alignment and exposure during an exposure process and is thus used as the light source for both the exposure and cleaning processes to reduce the cost of the optics system substantially. Generally, key control parameters for the laser, including fixed items of wavelength, duty cycle, beam profile, and beam focus, as well as other items of repetition rate and output energy per pulse, directly influence the throughput and the cleanness of the wafer chuck. Therefore, these important control factors are taken into account for choosing the light source and the optics system used in the lithography alignment system, so as to design a laser system with the best performance of the exposure and the cleaning.

Figure 2:
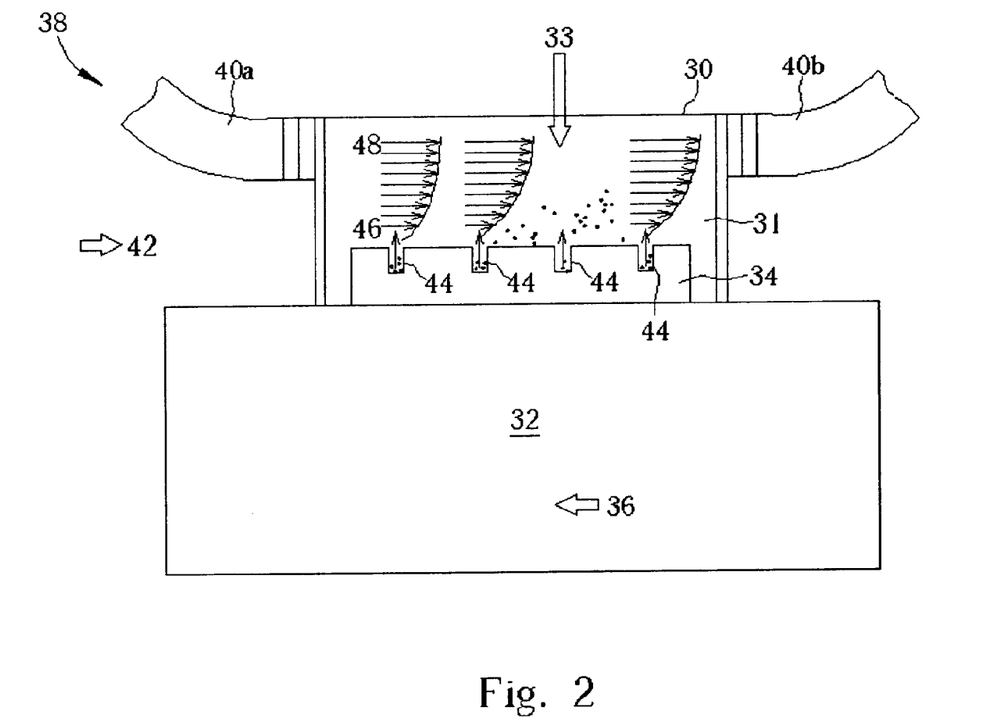
FIG. 2 is a schematic diagram of a laminar flow chamber according to the present invention.

A chamber and a gas flowing system are provided in the present invention to ensure the removal of the contaminants from the workspace to prevent recontamination or the emission of contaminants into the workspace from contaminating other devices, such as wafer stage, alignment laser, optics system or mirrors. Please refer to FIG. 2 of a schematic diagram of a laminar flow chamber 30 according to the present invention. As shown in FIG. 2, a laminar flow chamber 30 covers a wafer chuck 34 on a wafer stage 32 to form a hermetically sealed chamber 31, and the laminar flow chamber 30 is connected with a gas flowing system (not shown). The gas flowing system employs an inert gas 38, normally nitrogen, as a flowing gas to avoid unnecessary chemical reactions. During the laser cleaning process, the wafer chuck 34 is moved with the wafer stage 32 along a same x-y direction 36 to ensure that a surface of the wafer chuck 34 is entirely radiated by a fixed laser photo flux 33. Simultaneously, the nitrogen 38 employed by the gas flowing system flows into the laminar flow chamber 30 through a gas inlet 40a and flows out the laminar flow chamber 30 through an exhaust 40b along a direction 42 to form a laminar flow passing through the wafer chuck 34 surface. Therefore, the surface of the wafer chuck 34 has a more stable boundary layer for the mechanical removal of the contaminants deposited thereon. In addition, the deposited contaminants in a cranny 44 on the wafer chuck 34 surface are completely levitated from the cranny 44 as the pressure inside the cranny 44 is higher than the pressure of the boundary layer, and thus avoids the problem of incomplete cleaning in the nooks. Wherein parameters including cleaning efficiency (process speed), wafer stage stroke, dimensions of focus lens, and other factors in conjunction with workspaces of other systems are adjusted to design an optimal laminar flow chamber.

Since the stepper system according to the present invention further comprises a control system used to control displacement of the wafer stage 32 along the x-y directions, the conditions executed by the wafer chuck 34 are set by system parameters. Such conditions include cleaning speed, range, beam spot, flow rate of nitrogen, alarm, the frequency of automatic cleaning for the wafer chuck 34, and issuing a command by a technician from the interface to execute a cleaning once detecting an abnormal spot on the wafer chuck 34 from products or flatness monitor. Hence, the wafer chuck 34 is on-line cleaned, globally or locally, by using the control system with the hardware and software needed according to the present invention.

Figure 3:
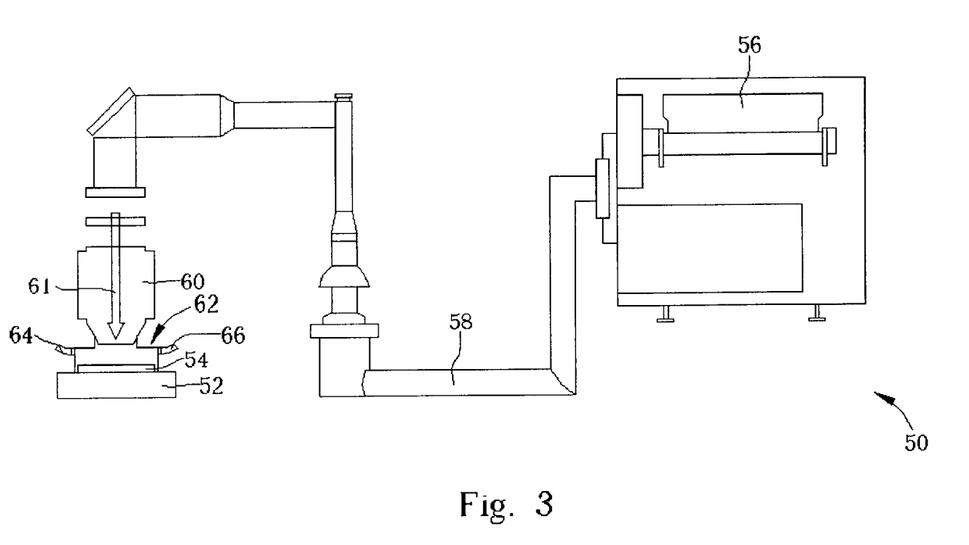
FIG. 3 is a schematic diagram of a stepper system according to the preferred embodiment of the present invention.

On the premise that the movements of the alignment system and the wafer stage are unaffected, there are various applications and configurations of the stepper system in the present invention according to the extent of the workspace between projection lens and the wafer chuck. Two embodiments of the stepper system according to the present invention are discussed below:

The preferred embodiment according to the present invention:

Please refer to FIG. 3 of a schematic diagram of a stepper system 50 in the preferred embodiment of the present invention. As shown in FIG. 3, the stepper system 50 comprises a wafer stage 52 capable of horizontally moving along x-y directions and vertically moving along z direction, a wafer chuck 54, for holding a wafer-to-be-exposed, fixed on the wafer stage 52, an excimer laser generation module 56 for generating a pulse laser with a predetermined wavelength, a laser beam delivery system 58 for guiding the pulse laser to the wafer chuck 54 at a predetermined incident angle, a projection lens system 60 for calculating a focal length of the pulse laser to the wafer-to-be-exposed, and a laminar flow chamber 62 located at one end of the laser beam delivery system 58 and used to isolate the wafer chuck 54 during the wafer chuck cleaning.

The laser beam delivery system 58 further comprises a steering mirror module (not shown) located on the optical path of the pulse laser, and a focus lens module (not shown) located between the steering mirror module and the wafer chuck 54.

Figure 4:
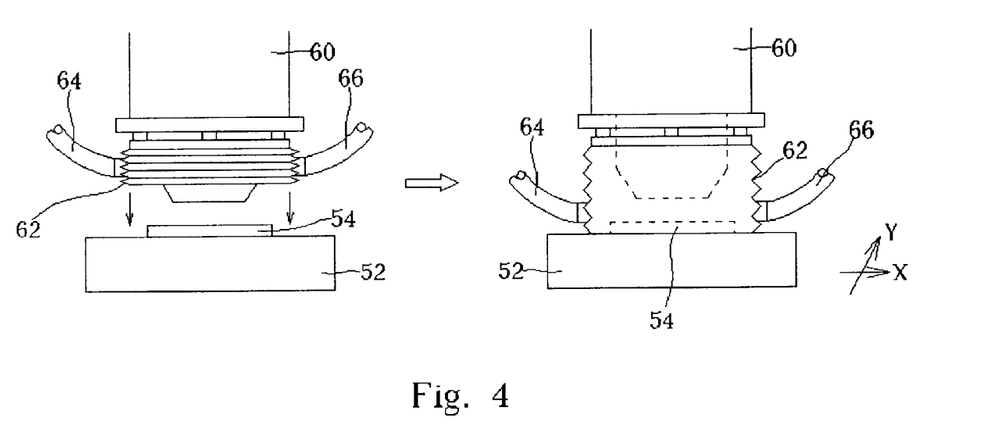
FIG. 4 is an enlarged schematic diagram of a laminar flow chamber shown in FIG. 3.

Please refer to FIG. 4 of a locally enlarged schematic diagram of the laminar flow chamber 62 in the stepper system 50 shown in FIG. 3. As shown in FIG. 4, the laminar flow chamber 62 located on one end of the projection lens system 60 is used to isolate the wafer chuck 54 during the cleaning of the wafer chuck 54 and has a gas inlet 64 and an exhaust 66 on its two sides, respectively. Wherein the laminar flow chamber 62 is connected with the laser beam delivery system 58 via a flexible joint that enables the laminar flow chamber 62 to move downward and upward, and thus takes up few space without affecting the original alignment system 60. Moreover, the laminar flow chamber 62 is flexible enough to make the photo flux radiate to the entire surface of the wafer chuck 54 by means of the removal of the wafer chuck 54.

As shown in FIG. 3 and FIG. 4, as the stepper system 50 is employed in a general process, the laminar flow chamber 62 is pulled up. After the excimer laser generation module 56 generates a KrF pulse laser, the pulse laser 61 is guided by the laser beam delivery system 58 and is focused by the movement of the projection lens system 60 along the z direction of the wafer stage 52 to the wafer-to-be-exposed. The pattern on the mask is then transferred to the wafer by the stepper system repeatedly and slowly. After performing the exposure process for a certain period so that the surface of the wafer chuck 54 is contaminated by the back surface of the wafer and needs to be cleaned, the laminar flow chamber 62 is pulled down to isolate the wafer chuck 54. Then, the excimer laser generation module 56 generates a KrF pulse laser, having a photon energy greater than 5.01 eV and a pulse energy greater than 150 mJ/pulse. Thereafter, the pulse laser is transferred by the steering mirror module and the focus lens module in the laser beam delivery system 58, focused by the projection lens system 60, and guided to the contaminated top surface of the wafer chuck 54 at a predetermined incident angle. Organic materials thereon are thus decomposed by the pulse laser. Finally, the decomposed organic materials are removed by nitrogen, provided by the inert gas supply and having an adjusted flow rate to form the laminar regime within the laminar flow chamber 62, introduced from the gas inlet 64.

Figure 5:
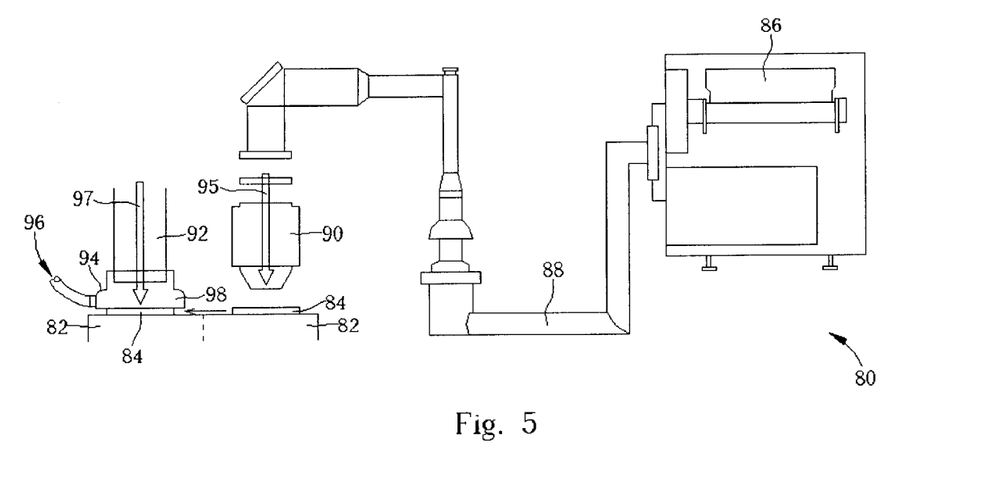
FIG. 5 is a schematic diagram of a stepper system according to another embodiment of the present invention.

Another embodiment of the present invention:

Please refer to FIG. 5 of a schematic diagram of a stepper system 80 in another embodiment of the present invention. As shown in FIG. 5, the stepper system 80 comprises a wafer stage 82 capable of horizontally moving, a wafer chuck 84 having concentric ring-type grooves or having pin-type holds distributed thereon, for holding a wafer-to-be-exposed, fixed on the wafer stage 82, a laser power supply 86 for providing a pulse laser, a projection lens module 90 located over the wafer chuck 84, a focus lens module 92 located at one side of the projection lens module 90, a steering mirror module (not shown) used to selectively guide the pulse laser to the projection lens module 90 or to the focus lens module 92, a flow chamber module 94 fixed on one end of the focus lens module 92 and used to isolate the wafer chuck 84 during the cleaning of the wafer chuck 84, and an inert gas supply (not shown) connected with the flow chamber module 94 and used to produce a laminar flow of inert gas in the laminar flow chamber 94.

As shown in FIG. 5, as the stepper system 80 is employed in a general process, the wafer chuck 84 moves under the projection lens module 90, and a loading arm loads a wafer-to-be-exposed on the wafer chuck 84. Then a KrF pulse laser 95 generated by the laser power supply 86 is guided to the projection lens module 90 to expose the wafer. After the exposure process is performed for a certain period so that the surface of the wafer chuck 84 is contaminated by the back surface of the wafer and needs to be cleaned, the wafer stage 82 can move to the underneath of the focus lens module 92 located at one side of the projection lens module 90. Then, the laser power supply 86 generates a KrF pulse laser 97, having a photon energy greater than 5.01 eV and a pulse energy greater than 150 mJ/pulse. Thereafter, the pulse laser 97 is transferred by the focus lens module 92, guided to radiate the contaminated top surface of the wafer chuck 84 entirely, and focusing by the movement along the z direction of the wafer stage 82 to decompose organic materials thereon. Finally, the decomposed organic particulates in the chamber 98 of the laminar flow chamber 94 is propelled away by nitrogen to prevent the recontaminations on the surface of the wafer chuck 84.

Since the required precision of the focus lens module 92 for cleaning the wafer chuck 84 is not as much as that of the projection lens module 90 used in the lithography exposure process, the steering mirror module is employed to guide the pulse laser to the bottom of the laminar flow chamber 94 through the focus lens module 92 rather than through the projection lens module 90. Therefore, the huge difference between the two embodiments of the present invention is that the chamber 98 is designed as an individual space to prevent the chamber 98 located in the workspace from affecting the precision of the alignment system. Additionally, the chamber 98 does not need to be made of flexible material and is capable of being fixed under the projection lens module 92. However, the wafer chuck 84 in this embodiment needs a longer stroke and hence requires a lager space to accommodate the apparatus.

In summary, the present invention employs a DUV KrF pulse laser with a wavelength of 248 nm to provide sufficient power to remove contaminants, such as hydrocarbons generated in the air and metal debris accumulated on the back surface of the wafer. By using the computer system to on-line clean the wafer chuck, the various problems encountered by the manual cleaning process as discussed in the prior art are eliminated. Moreover, the present invention also has the advantages of being fast, timesaving and convenient, and prevents disadvantages caused by manual operations.

In addition, the apparatus for on-line cleaning the wafer chuck by laser according to the present invention further brings the advantages below:

1. No chemical mist is generated and left in the workspace since no chemicals are used in the laser cleaning process. There is thus no hazardous waste generated.
2. The cover of the system does not to be opened, so that no dust enters into the system to make the system contaminated.
3. The design of the chamber position and the nitrogen ventilate piping prevent damage to the alignment system during the cleaning process.
4. The mechanical force generated by nitrogen in the laminar flow chamber removes the contaminants accumulated in crannies and nooks.
5. The performance of cleaning processes for wafer chucks in various shapes and materials is controlled by adjusting parameters, such as laser light source, and the cleaning efficiency of the wafer chuck is thus improved.

In comparison with the prior art, the present invention employs a laser cleaning process to remove contaminants on the wafer chuck surface and thus avoids the various shortcomings of the cleaning treated manually. Moreover, the stepper system with the control system to carry out the on-line cleaning process for the wafer chuck by laser is provided in the present invention. Efforts spent on handling abnormal situations during the flatness monitor process of the wafer chuck are saved, the down time of the stepper system is reduced, and contamination to the system environment is prevented therefore. Additionally, both the exposure process and the cleaning process for the wafer chuck use the same light source. Consequently, the manufacturing cost is reduced with an improved performance of the exposure process ensured.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A stepper system having an on-line wafer chuck laser cleaning apparatus, the stepper system comprising:
   an excimer laser generation module for generating a pulse laser with a predetermined wavelength;
   a wafer stage capable of horizontally moving along x-y directions vertically moving along z direction;
   a control system used to control displacements of the wafer stage along the x-y directions and the z direction;
   a wafer chuck, for holding a wafer-to-be-exposed by vacuuming, fixed on the wafer stage, the wafer chuck having a top surface capable of being contaminated by organic material;
   a laser beam delivery system for guiding the pulse laser either to a contaminated top surface of the wafer chuck at a predetermined incident angle to decompose organic material thereon by the pulse laser, or to the wafer-to-be-exposed held on the wafer chuck to transfer pattern on a mask to the wafer-to-be-exposed;
   a projection lens system for focusing the pulse laser to the wafer-to-be-exposed;
   a laminar flow chamber located at one end of the laser beam delivery system and used to isolate the wafer chuck during the wafer chuck cleaning, the laminar flow chamber having an opening at a bottom, a gas inlet, and an exhaust; and
   an inert gas supply connected with the gas inlet of the laminar flow chamber for providing an inert gas flow, wherein the inert gas flow is in a laminar regime within the laminar flow chamber facilitating the removal of the decomposed organic material from the top surface of the wafer chuck;
   wherein the organic matter contaminated top surface of the wafer chuck is globally or locally cleaned by the control of the control system-controlled wafer stage.

2. The stepper system of claim 1, wherein the laser beam delivery system comprises:
   a steering mirror module located on the optical path of the pulse laser; and
   a focus lens module located between the steering mirror module and the wafer chuck;
   wherein the laminar flow chamber is located on one end of the focus lens module.

3. The stepper system of claim 1, wherein a casing of the laminar flow chamber is connected with the laser beam delivery system via a flexible joint that enables the laminar flow chamber to move downward and upward, and the casing generates a hermetically-sealed region within the laminar flow chamber after moving downward and contacting the wafer stage.

4. The stepper system of claim 1, wherein the pulse laser is a krypton fluoride (KrF) pulse laser.

5. The stepper system of claim 1, wherein the pulse laser has a photon energy greater than 5.01 eV.

6. The stepper system of claim 1, wherein the pulse laser guided to the wafer chuck has a pulse energy greater than 150 mJ/pulse.

7. The stepper system of claim 1, wherein the wafer chuck is a wafer chuck having grooves or having pins distributed thereon for sucking the wafer-to-be-exposed.

8. The stepper system of claim 1, wherein the inert gas is laminar nitrogen.

9. A wafer exposure system with a built-in wafer chuck laser cleaning apparatus, the wafer exposure system comprising:
   a wafer stage capable of horizontally or vertically moving;
   a wafer chuck, for holding a wafer-to-be-exposed by vacuuming, fixed on the wafer stage;
   a laser power supply for providing a pulse laser;
   a projection lens module located over the wafer chuck;
   a focus lens module located at one side of the projection lens module;
   a steering mirror module used to selectively guide the pulse laser to the projection lens module or the focus lens module;
   a flow chamber module, fixed on one end of the focus lens module, used to isolate the wafer chuck during wafer chuck cleaning; and
   an inert gas supply, connected with the flow chamber module, used to produce a laminar flow of inert gas;
   wherein in a wafer chuck cleaning phase, the wafer stage moves under the focus lens module, the flow chamber module moves downward and covers the wafer chuck in a hermetically sealing manner, the pulse laser is guided to the contaminated top surface through the focus lens module; after the wafer chuck cleaning phase, the wafer stage returns under the projection lens module, a loading arm loads a wafer onto the cleaned wafer chuck, and the wafer is exposed by the pulse laser guided through the projection lens module.

10. The wafer exposure system of claim 9, wherein the flow chamber further comprises a flexible joint used to enable the laminar flow chamber to move downward and upward.

11. The wafer exposure system of claim 9, wherein the pulse laser is a KrF pulse laser.

12. The wafer exposure system of claim 9, wherein the pulse laser has a photon energy greater than 5.01 eV.

13. The wafer exposure system of claim 9, wherein the pulse laser guided to the wafer chuck has a pulse energy greater than 150 mJ/pulse.

14. The wafer exposure system of claim 9, wherein the wafer chuck is a wafer chuck having grooves thereon for sucking the wafer-to-be-exposed.

15. The wafer exposure system of claim 9, wherein the wafer chuck is a wafer chuck having pins distributed thereon for sucking the wafer-to-be-exposed.

16. The wafer exposure system of claim 9, wherein the inert gas is inert nitrogen.

17. A stepper system having an on-line wafer chuck laser cleaning apparatus, the stepper system comprising:
   an excimer laser generation module for generating a pulse laser with a predetermined wavelength;
   a wafer stage capable of horizontally moving along x-y directions vertically moving along z direction;
   a control system used to control displacements of the wafer stage along the x-y directions and the z direction;

a wafer chuck, for holding a wafer-to-be-exposed by vacuuming, fixed on the wafer stage, the wafer chuck having a top surface capable of being contaminated by organic material;

a laser beam delivery system for guiding the pulse laser to a contaminated top surface of the wafer chuck at a predetermined incident angle, and decomposing organic material thereon by the pulse laser;

a projection lens system for focusing the pulse laser to the wafer-to-be-exposed;

a laminar flow chamber located at one end of the laser beam delivery system and used to isolate the wafer chuck during the wafer chuck cleaning, the laminar flow chamber having an opening at a bottom, a gas inlet, and an exhaust, a casing of the laminar flow chamber being connected with the laser beam delivery system via a flexible joint that enables the laminar flow chamber to move downward and upward to generate a hermetically-sealed region within the laminar flow chamber after moving downward and contacting the wafer stage; and an inert gas supply connected with the gas inlet of the laminar flow chamber for providing an inert gas flow, wherein the inert gas flow is in a laminar regime within the laminar flow chamber facilitating the removal of the decomposed organic material from the top surface of the wafer chuck;

wherein the organic matter contaminated top surface of the wafer chuck is globally or locally cleaned by the control of the control system-controlled wafer stage.

* * * * *